Jan. 4, 1927.  1,613,345
L. R. CULVER
AUTOMOBILE TRAIN
Filed May 21, 1924   8 Sheets-Sheet 1
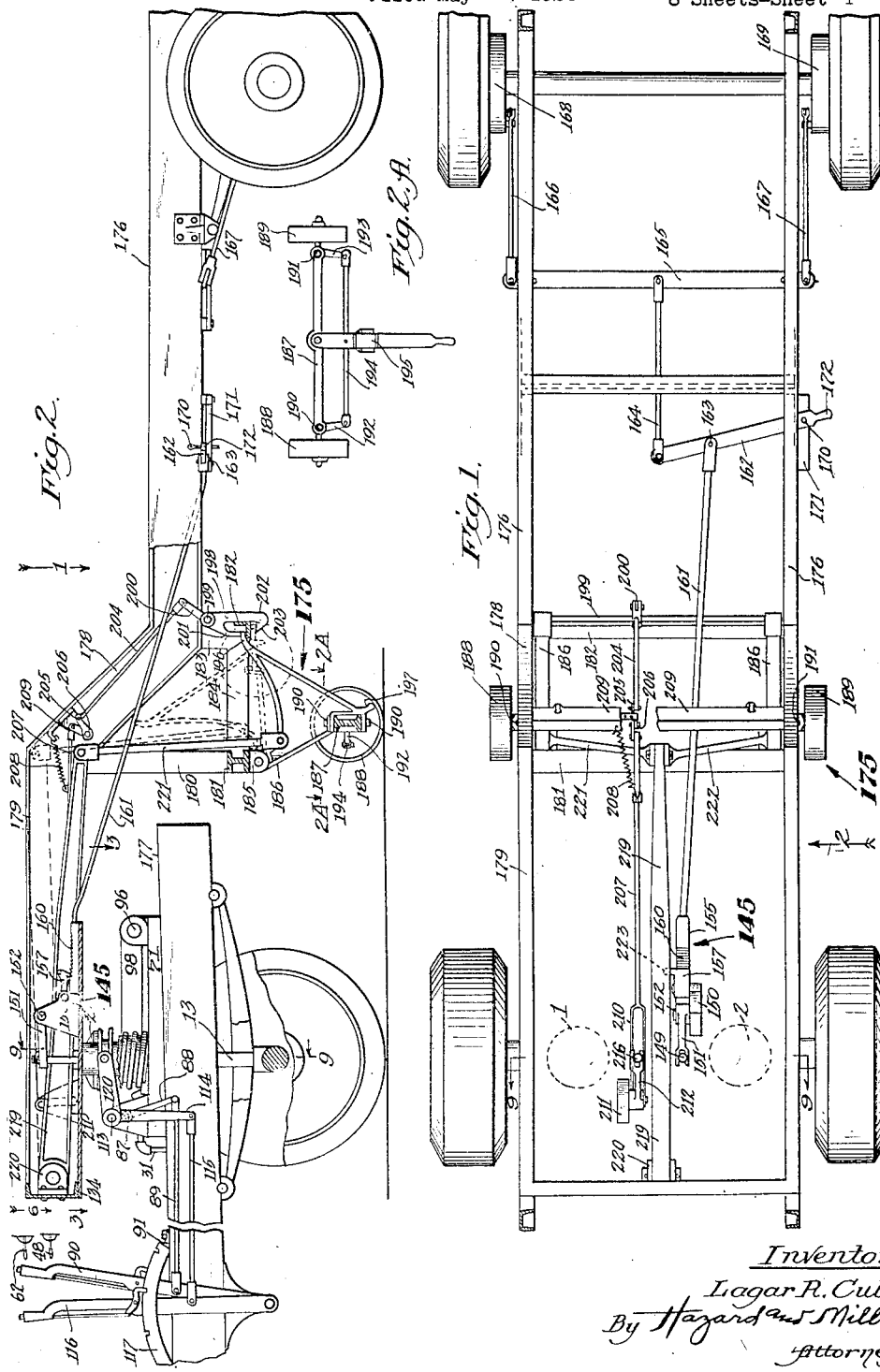
Inventor:
Lagar R. Culver
By Hazard and Miller
Attorneys Jan. 4, 1927.　　　　　L. R. CULVER　　　　　1,613,345
AUTOMOBILE TRAIN
Filed May 21, 1924　　　8 Sheets-Sheet 2
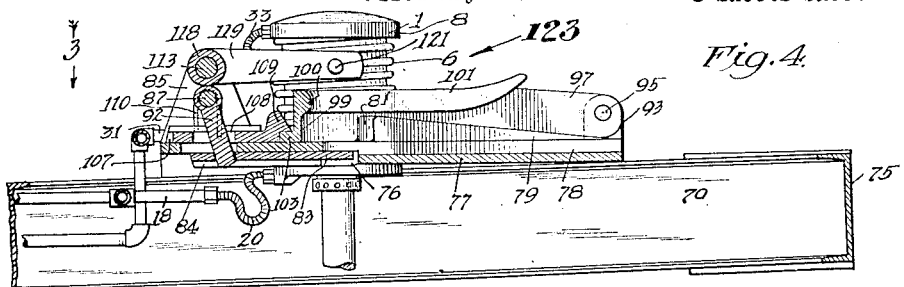
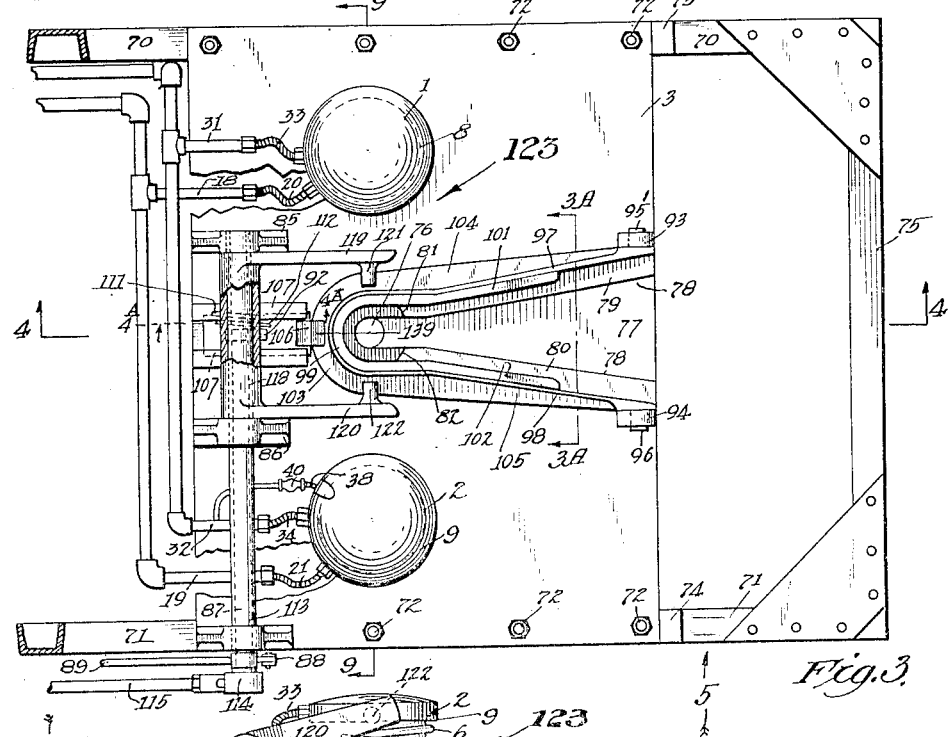
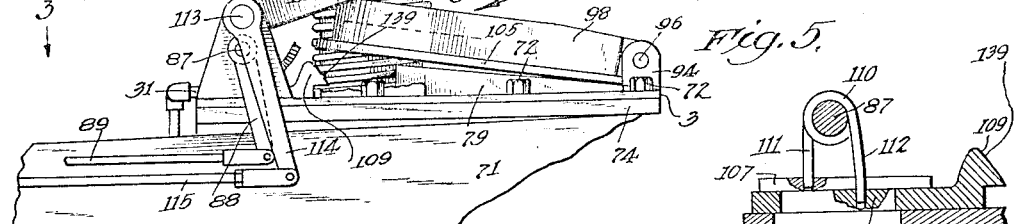
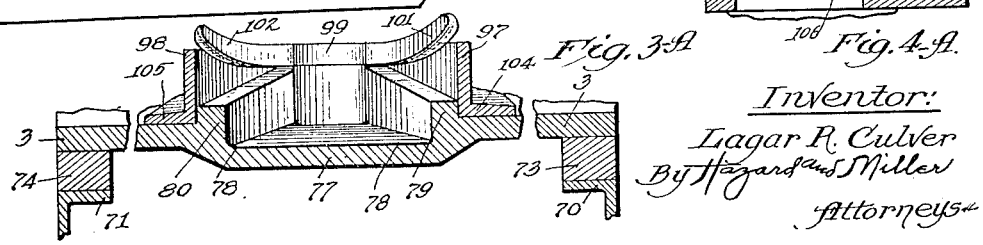
Inventor:
Lagar R. Culver
By Hazard and Miller
Attorneys Inventor:
Lagar R. Culver.
By Hazard and Miller
Attorneys

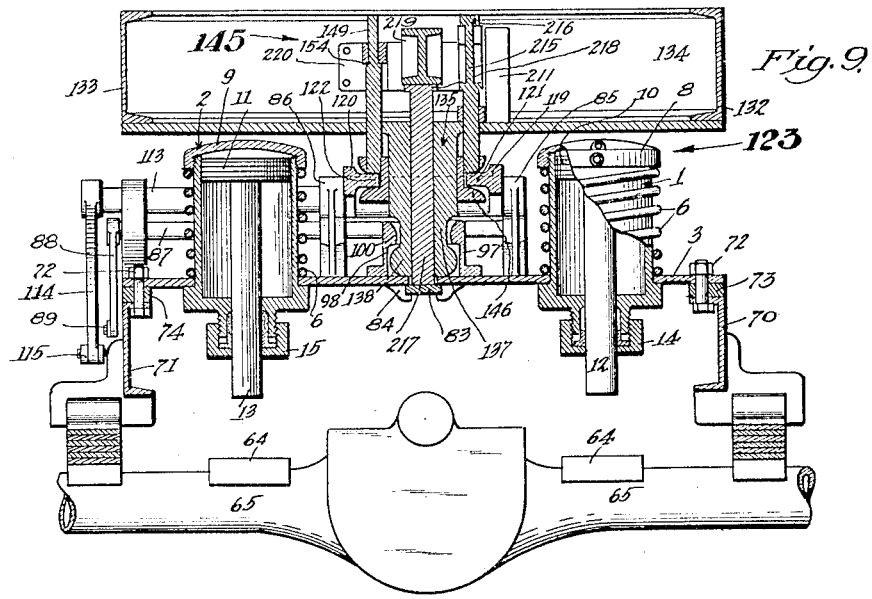
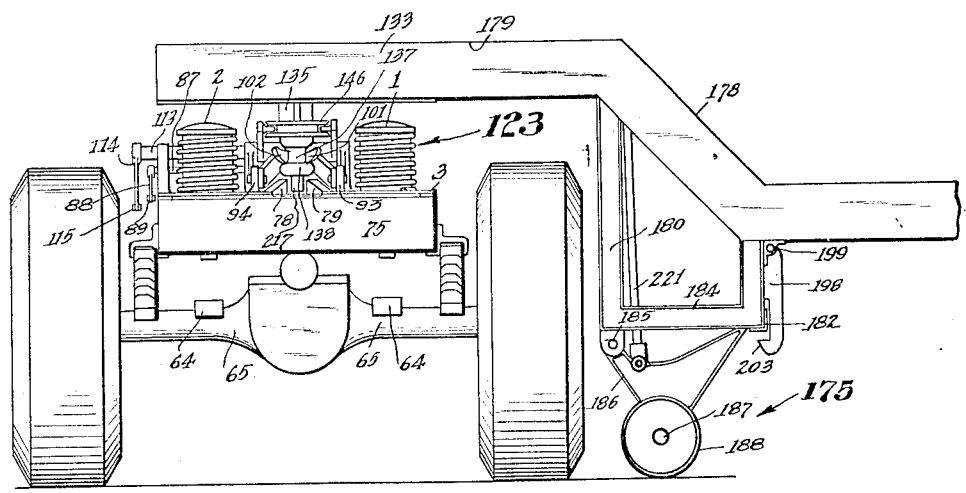

Jan. 4, 1927.
L. R. CULVER
1,613,345
AUTOMOBILE TRAIN
Filed May 21, 1924    8 Sheets-Sheet 5
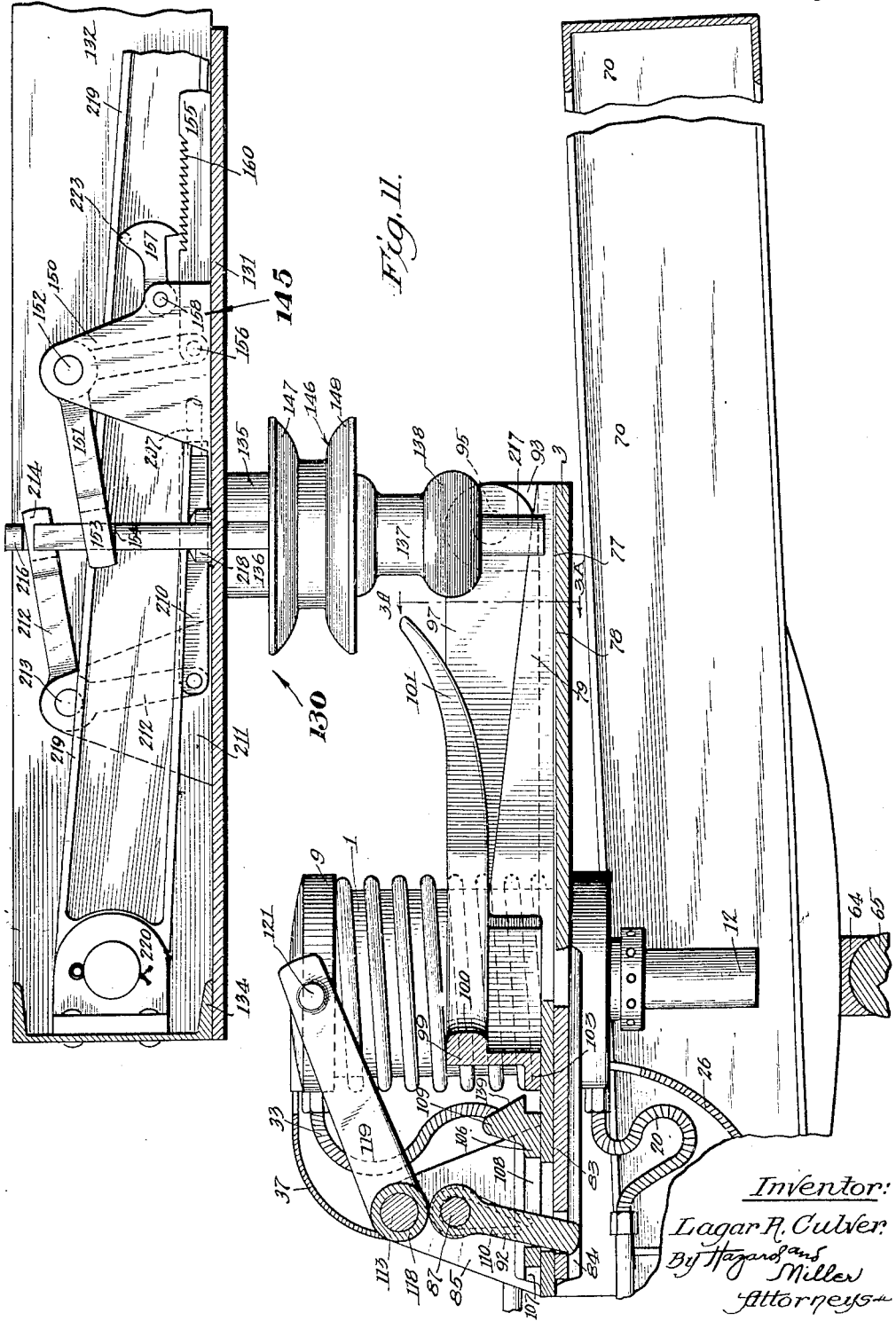

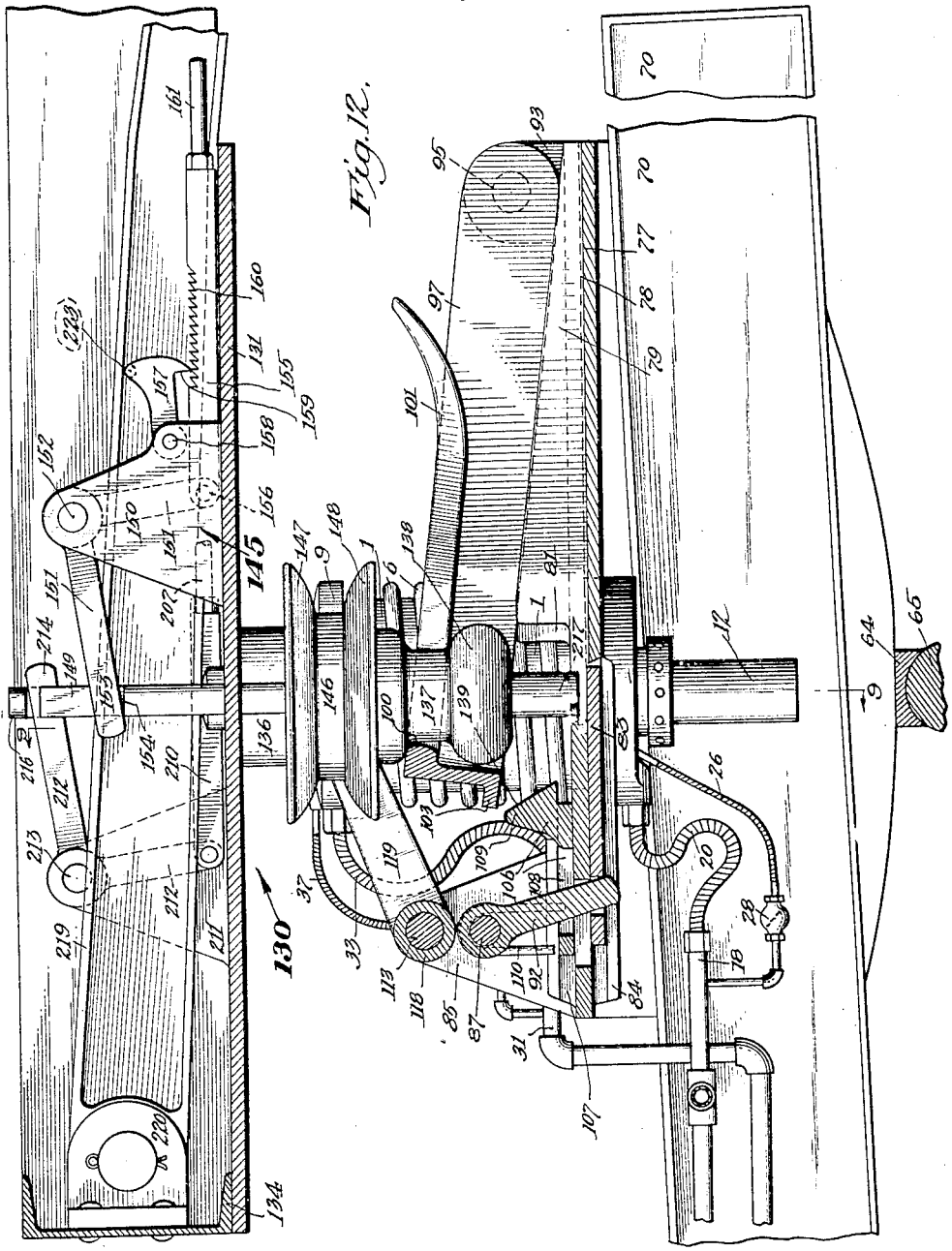

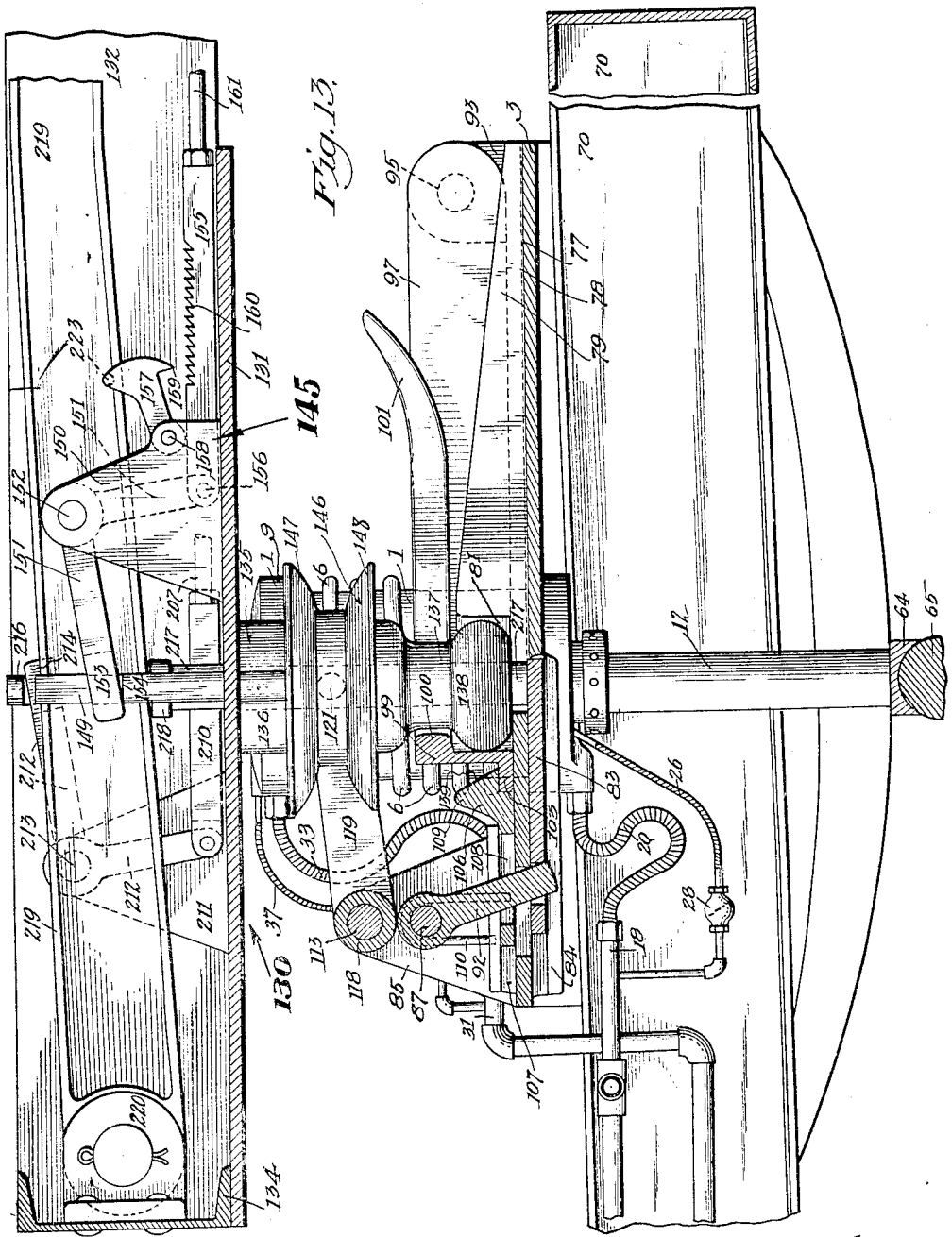

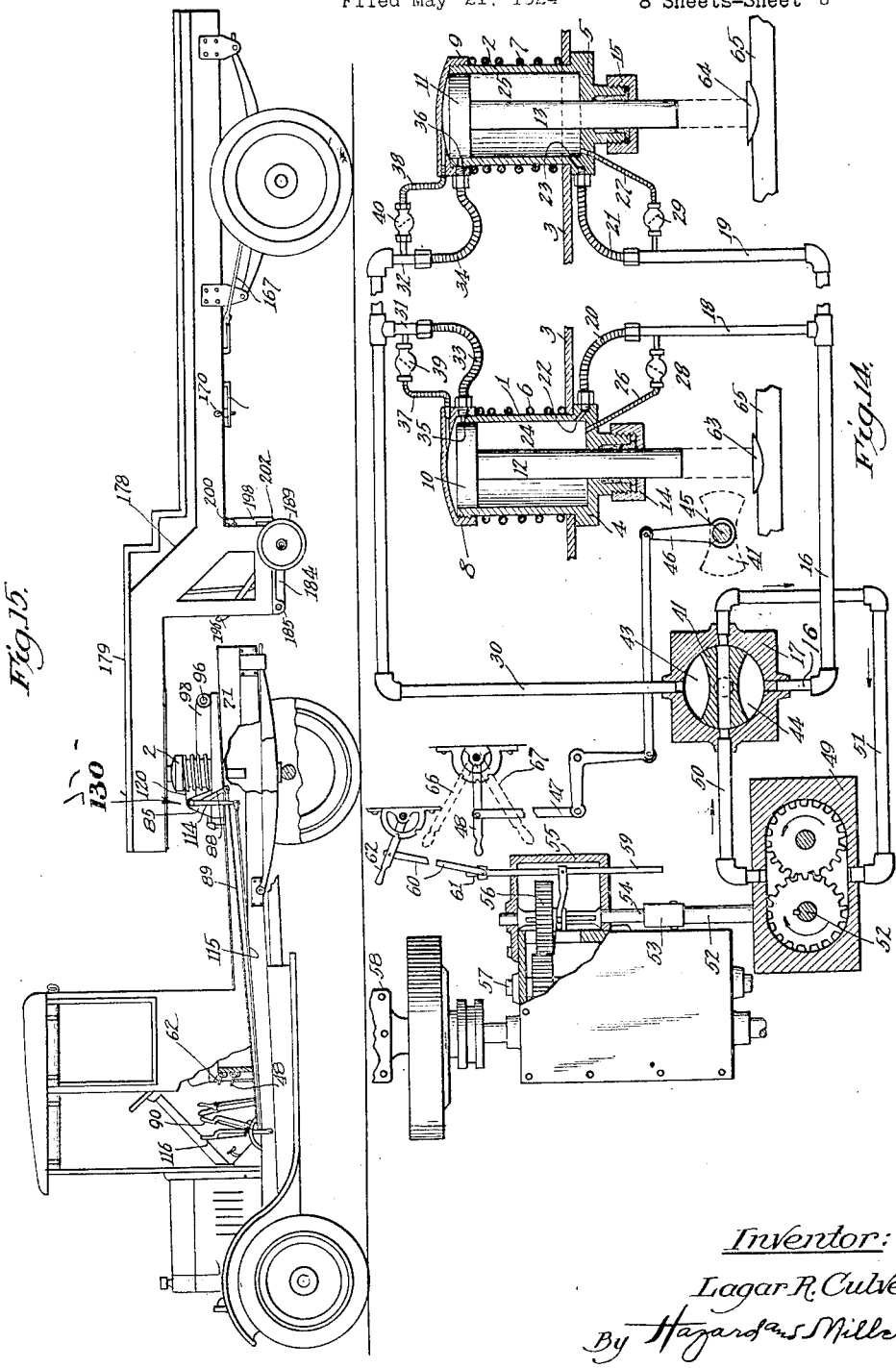

Patented Jan. 4, 1927.

1,613,345

UNITED STATES PATENT OFFICE.

LAGAR RUAL CULVER, OF LOS ANGELES, CALIFORNIA, ASSIGNOR TO NEW-COMER TRAILER MFG. CO., OF LOS ANGELES, CALIFORNIA, COMPOSED OF CORWIN R. WELSH AND EARL R. CLAYTON.

AUTOMOBILE TRAIN.

Application filed May 21, 1924. Serial No. 714,838.

My invention relates to automobile trains and consists of the novel features herein shown, described and claimed.

More specifically, my invention relates to an automobile train comprising a tractor and a semi-trailer adapted to be readily attached together and readily detached, and with special reference to the mechanism for connecting the semi-trailer to the tractor and for supporting the semi-trailer when disconnected from the tractor.

A leading and distinguishing feature of my invention is the provision of means whereby all the hard work of connecting and disconnecting automobile trains is performed by the power plant upon the tractor operating through a hydraulic system.

Another feature of my invention consists in mounting two vertical piston cylinder constructions upon the rear end of the tractor and connecting the piston cylinders to the hydraulic system operated by the tractor power plant so as to furnish the power for connecting and disconnecting the trailer and tractor.

Another feature of my invention is the provision of mechanism for connecting semi-trailers to tractors and having a hydraulic system for raising the forward end of a trailer and providing secondary wheels for supporting the trailer in its raised resting position so that the tractor may be readily driven away from the trailer, and so that the tractor may be returned to the trailer and the hydraulic system operated to make the connection.

Another object is to raise the front end of the semi-trailer high enough so that when the springs of the tractor expand by being relieved of the load of the trailer, still the tractor will pass freely under the raised end of the trailer.

Another object is to make connector elements on a tractor and connector elements on a trailer to engage and disengage the elements on the tractor by vertical movement from power derived from the operation of the power plant on the tractor and transmitted through a hydraulic system.

Another object of my invention is to make a mechanism for connecting a semi-trailer to a tractor and having a brake mechanism to hold the trailer while the trailer is standing alone disconnected from the tractor, said brake mechanism being set by the disconnecting operation.

Another object is to make improved means for supporting a semi-trailer when disconnected from a tractor, said means including secondary wheels to be raised or lowered and to be operated from the tractor.

Another object is to make a hydraulic system to be operated by the power plant of a tractor for connecting a semi-trailer to a tractor, so that the forward end of the semi- trailer will be carried upon the rear end of the tractor.

Another object is to make an automobile train comprising a tractor and semi-trailer, provide means for coupling the tractor to the semi-trailer, and operate the coupling means from the operators seat upon the tractor and by operating the tractor power plant to operate a hydraulic system.

Another leading object is to make a mechanism for connecting semi-trailers to tractors so that when the forward ends of the semi-trailers are raised and disconnected from the tractors the trailers are held up at the desired height while the tractors are driven away and the tractors may return to be connected to the trailers at any angle at which the tractor will clear the means for supporting the front end of the trailer.

Another object is to make an automobile train in which the operator on the tractor can control the brakes on the semi-trailer when the train is coupled and to set the brakes on the trailer when the trailer is to be left uncoupled.

Another object is to make an automobile train in which the semi-trailer has handdirigible extensible retractable secondary wheels controlled by the operator on the tractor and for supporting the front end of the trailer when standing alone.

Other objects and advantages will appear from the drawings and specification.

The drawings illustrate an automobile train embodying the principles of my invention.

Figure 1 is a top plan view of the semi-trailer with the rear end of the tractor under the forward end of the trailer, the platform of the trailer being omitted to show the operating mechanism.

Fig. 2 is a fragmentary vertical longitudinal elevation partly in section and looking in the direction indicated by the arrow 2 in Fig. 1.

Fig. 2ᴬ is a section on the line 2ᴬ—2ᴬ of Fig. 2.

Fig. 3 is an enlarged top plan view of the rear end of the tractor, the view being taken as on the line 3—3 of Fig. 2, and looking downwardly as indicated by the arrows, and also as looking downwardly as indicated by the arrows 3 in Figs. 4 and 5.

Fig. 3ᴬ is an enlarged section on the lines 3ᴬ—3ᴬ of Figs. 3 and 11.

Fig. 4 is a vertical longitudinal section on the line 4—4 of Fig. 3.

Fig. 4ᴬ is a section on the line 4ᴬ—4ᴬ of Fig. 3.

Fig. 5 is a side elevation on the plane parallel with Fig. 4, and as seen looking in the direction indicated by the arrow 5 in Fig. 3.

Figure 7:
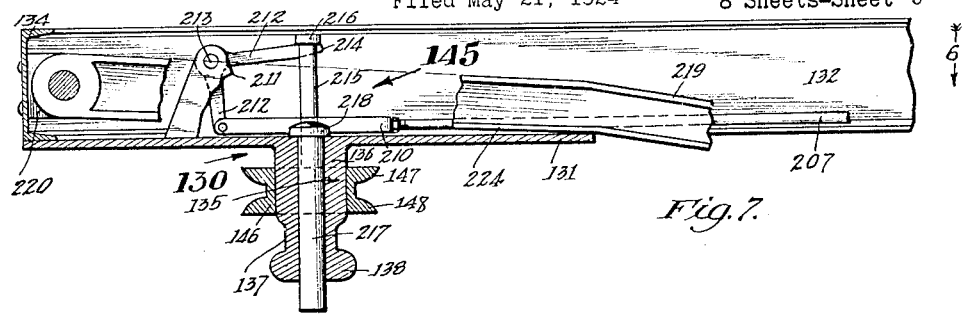
Figure 6:
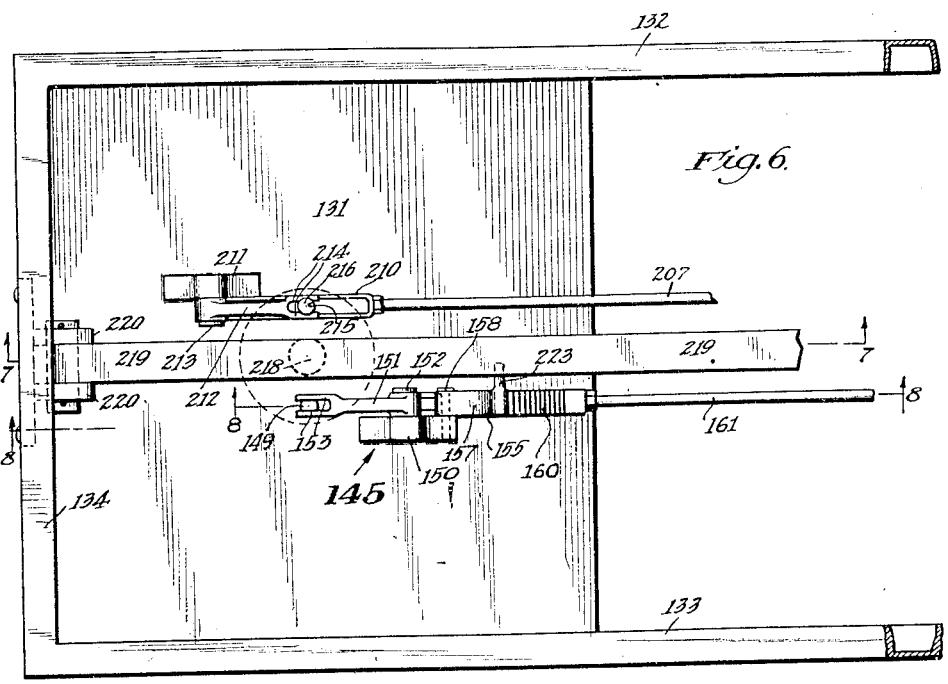
Figure 8:
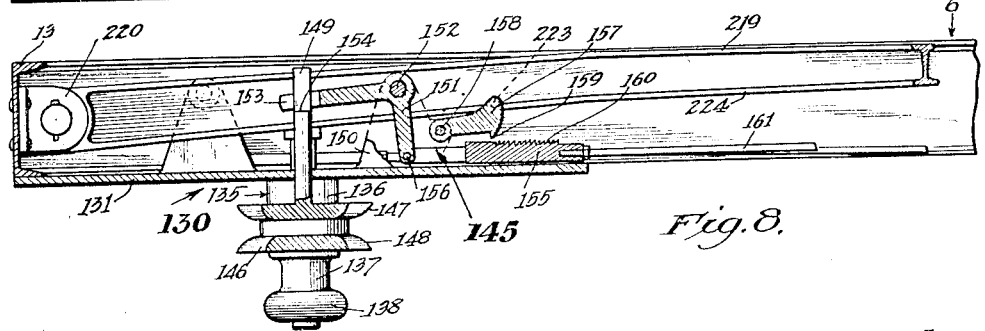

Fig. 6 is an enlarged top plan view of the forward end of the semi-trailer as shown in Fig. 1 and as seen looking in the direction indicated by the arrow 6 in Fig. 2, and as indicated by the arrows 6 in Figs. 7 and 8.

Fig. 7 is a vertical longitudinal section on the line 7—7 of Fig. 6 and looking in the direction indicated by the arrows.

Fig. 8 is a vertical longitudinal section on a plane parallel with Fig. 7 and on the line 8—8 of Fig. 6, and looking in the direction indicated by the arrows, the parts being in different relative locations in Figs. 7 and 8 to illustrate operations.

Fig. 9 is an enlarged fragmentary vertical cross sectional detail on the lines 9—9 of Figs. 1 and 2 and looking in the direction indicated by the arrows, Figs. 1 and 2 being upon a smaller scale, and the view also being taken on the line 9—9 of Fig. 12.

Fig. 10 is a view in elevation as seen when the tractor is standing at right angles to the semi-trailer and showing the operation of coupling the tractor to the semi-trailer, the view being a side elevation of the forward end of the trailer and a rear elevation of the tractor, and so far as the tractor is concerned, the view is on a plane parallel with Fig. 9.

Fig. 11 is an enlarged fragmentary vertical longitudinal section showing the first step in making the coupling to connect the semi-trailer to the tractor, the view being similar to Fig. 8 placed upon Fig. 4 with the parts not yet in vertical alinement.

Fig. 12 is a view analogous to Fig. 11, and showing a further step in the coupling operation.

Fig. 13 is a view analogous to Figs. 11 and 12 and showing a further step in the coupling operation.

Fig. 14 is a diagrammatic view of the hydraulic system by which the power plant of the tractor performs the hard work of coupling the tractor to the semi-trailer.

Fig. 15 is a fragmentary side elevation showing the trailer and tractor coupled together as when in operation between stations.

The details of the automobile train shown in the drawings are as follows:

Referring especially to Figs. 14 and 15, the details of the hydraulic system operated by the power plant of the tractor are as follows:

The piston cylinders 1 and 2 are inserted upwardly through the supporting platform 3, said platform 3 being mounted upon the frame at the rear end of the tractor. Heads 4 and 5 upon the lower ends of the cylinders limit the upward movement of the cylinders. Heavy expansion coil springs 6 and 7 are mounted around the cylinders above the platform 3. Cylinder heads 8 and 9 are screwed upon the upper ends of the cylinders 1 and 2 against the springs 6 and 7, one object being to mount the cylinders 1 and 2 to yield up and down to some extent through the platform 3. Pistons 10 and 11 are mounted in the cylinders 1 and 2. Piston stems 12 and 13 extend downwardly from the pistons 10 and 11 through the heads 4 and 5, there being stuffing boxes 14 and 15 upon the heads 4 and 5 through which the stems 12 and 13 slide. An oil pipe 16 leads from the valve casing 17 and branches 18 and 19 lead from the pipe 16, the upper ends of the branches 18 and 19 having flexible sections 20 and 21 connected to the peripheries of the heads 4 and 5 and communicate with ports 22 and 23 leading through the heads into the piston chambers 24 and 25. The inner ends of the ports 22 and 23 are somewhat above the lower ends of the chambers 24 and 25 so that when the pistons 10 and 11 come down they will close the ports 22 and 23. By-pass branches 26 and 27 lead from the upper ends of the branches 18 and 19 through inlet check valves 28 and 29 and through the bottoms formed by the heads 4 and 5 into the bottoms of the chamber 24 and 25, so that when the pistons 10 and 11 come down and close the ports 22 and 23, continued operation of the pump will force oil past the check valves 28 and 29 into the bottoms of the chambers 24 and 25 against the faces of the pistons 10 and 11, so as to start the pistons upwardly, and so that the check valves 28 and 29 will hold the oil from flowing backwardly out of the chambers 24 and 25 through the pipes 26 and 27. The portions of the pipes 26 and 27 between the check valves 28 and 29 and the heads 4 and 5 are flexible to correspond to the flexibility of the portions 20 and 21 and allow the cylinders 1 and 2 to yield.

In a like manner, a pipe 30 leads from the opposite side of the valve casing 17 and has branches 31 and 32 with flexible portions 33 and 34 leading to the peripheries of the cylinder heads 8 and 9 and discharging through ports 35 and 36 into the upper ends of the chambers 24 and 25 and the ports 35 and 36 are spaced down from the tops of the chambers so that when the pistons 10 and 11 go up past the ports 35 and 36 the pistons will close the ports. By-pass branches 37 and 38 having flexible sections lead through inlet check valves 39 and 40 into the tops of the chambers 24 and 25 so that when the ports 35 and 36 are closed by the pistons 10 and 11 and it is desired to lower the pistons, oil may be pumped through the pipe 30 and by-pass branches 37 and 38 to the tops of the pistons and oil cannot pass from the chambers 24 and 25 through the by-passes 37 and 38 on account of the check valves 39 and 40.

When the pistons 10 and 11 are in the lower position they cover the ports 22 and 23 and when in the upper position they cover the ports 35 and 36. In such cases the upper and lower sides of the piston are subjected to direct hydraulic pressure from the pumps, which pressure is resisted by the fluid trapped between the ends of the cylinders and pistons, the trapped fluid being held by the check valves 28 and 29 and 39 and 40 in the respective cases. As above mentioned the by-passes 26, 27, 37 and 38 transmit the initial flow to move the pistons up or down.

The valve casing 17 has a rotatable valve member 41 with a neutral port 42 extending diametrically across its center and with operating ports 43 and 44 parallel with the neutral ports 42 and spaced therefrom. The stem 45 of the valve member 41 extends through the casing 17 and an operating crank 46 is fixed upon the stem. A link 47 extends from the crank 46 and the operating handle 48 is connected to the link 47.

The rotary pump 49 is of the gear type. A pipe 50 connects the delivery side of the pump to the valve casing 17 at right angles to the pipes 16 and 30, which are in a diametrical line, and the intake pipe 51 connects the intake side of the pump 49 to the valve casing 17 at a point diametrically opposite the pipe 50. The driving shaft 52 of the pump extends through the pump casing to a universal joint 53 and the shaft 54 is connected to the universal joint 53 and extends through the shift gear casing 55. A spur gear 56 slidingly splined upon the shaft 54 is adapted to move into and out of mesh with the transmission shaft 57 driven by the tractor engine 58. A shift mechanism 59 operates the gear 56 and extends through the casing 55 and is connected by links and bell crank levers 60 and 61 to an operating lever 62 so that when desired the pump may be disconnected from the power plant and remain idle, and when it is desired to use the hydraulic system, the hand lever 62 is operated to move the gear 56 into mesh with the gear 57 and the pump 49 is started. At this time the hand lever 48 should be in position to bring the port 42 into line to connect the pipe 50 to the pipe 51 and the oil will circulate without operating the hydraulic system. The principal work for the hydraulic system is to press downwardly upon the pistons 10 and 11 to press the stems 12 and 13 against the pads 63 and 64 upon the rear axle 65 of the tractor so as to raise the rear end of the tractor body, including the platform 3, to raise the forward end of the semi-trailer, and then after this raising operation is performed to reverse the circulation and raise the pistons 10 and 11 out of engagement with the pads 63 and 64 and lower the tractor body and leave the trailer up.

When the hand lever 48 is in central position, the valve member 41 is in neutral position with the port 42 connecting the pipes 50 and 51, and when the handle 48 is moved to the dotted line position 66, the valve member 41 is moved so that the port 43 connects the pipes 30 and 51 and the port 44 connects the pipes 50 and 16 and operation of the pump will force oil into the lower ends of the chambers 24 and 25 to raise the pistons 10 and 11 to their normal positions in the upper ends of the chambers. At the start of this operation, the pistons 10 and 11 will be down and close the ports 22 and 23 and the oil will pass through the by-pass pipes 26 and 27 to start the pistons upwardly. When the chambers 24 and 25 are filled with oil, until the pistons 10 and 11 pass upwardly and close the ports 35 and 36, continued operation of the pump will produce no further results because the oil that is to be forced into the chambers 24 and 25 below the pistons must come from above the pistons, and when the ports 35 and 36 are closed, no more oil can come from above the pistons, and the tendency will be to create a vacuum and this will stop the circulation of the oil, even though the pump continues to run. The object is to hold the pistons 10 and 11 upwardly at the tops of the cylinders 24 and 25 without entirely exhausting the oil from above the pistons. In other words, the pistons float and do not hit the heads 8 and 9.

When it is desired to raise the rear end of the tractor in the operation of coupling and uncoupling the trailer, the hand lever 48 is moved to the dotted line position 67, thereby causing the port 44 to connect the pipe 50 to the pipe 30 and the port 43 to connect the pipe 51 to the pipe 16. Then the operation of the pump will force oil through the pipes 50 and 30 and first through the by-pass pipes 37 and 38 to the tops of the cylinders 10 and 11 and draw the oil from below the cylinders 10 and 11 until the pistons 12 and 13 engage the pads 63 and 64 and raise the cylinders 1 and 2 and cooperating parts and until the pistons 10 and 11 close the ports 22 and 23. When the pistons 10 and 11 are raised to the desired extent, moving the hand lever 48 to neutral position will stop the circulation of oil and hold the pistons out of engagement with the pads 63 and 64.

Aside from the hydraulic system, the details of the tractor connector assembly are as follows:

The supporting platform 3 is heavy and strong and is mounted upon the body frame side bars 70 and 71 and secured in place by bolts 72. Blocks 73 and 74 are placed between the upper faces of the side bars 70 and 71 and the lower face of the platform 3, so as to raise the platform 3 to a level clearly above the rear cross bar 75. An opening 76 is formed vertically through the platform 3 at its transverse center and somewhat in front of its longitudinal center. A portion 77 of the platform 3 extends from the opening 76 to the rear edge of the platform 3 and is depressed substantially the thickness of the material of the platform and gradually flares from the opening 76 backwardly to make a wedge shaped depression or track 78 leading from the rear edge of the platform 3 to the opening 6. Walls 79 and 80 extend upwardly from the sides of the track 78, said walls gradually rising from nothing at the rear edge of the platform 3 to a substantial height, said walls terminating in abutments 81 and 82 at their forward ends, said abutments being equally spaced from the opening 76 and concentric to the opening.

A sliding supporting plate 83 is mounted under the platform 3 in a slide way 84 and substantially on a level with the depressed portion 77, so as to move backwardly and close the opening 76 and move forwardly out of the opening 76. Bearing brackets 85 and 86 are mounted upon the platform 3. A rock shaft 87 is mounted in the brackets 85 and 86 transversely of the tractor frame. A crank arm 88 is fixed upon the end of the shaft 87 outside of the frame side bar 71. A link 89 is connected to the crank arm 88 and to a connecting hand lever 90 mounted upon the forward part of the tractor convenient to the operator and controlled by a sector 91. An operating arm 92 is fixed upon the shaft 87 and extends freely through a slot in the platform 3 and through an opening in the supporting plate 83 so that when the hand lever 90 is moved backwardly to cover the plate 83 is moved backwardly to cover the opening 76, and when the connecting hand lever 90 is moved forwardly, the opening 76 is uncovered.

Bearings 93 and 94 extend upwardly from the platform 3 near its rear edge and outside of the guide walls 79 and 80, and a vertically swinging guide way member 95 has rear ends pivotally connected to the bearings 93 and 94 by pintles 95' and 96. The arms 97 and 98 extend forwardly from the pintles 95' and 96 outside of the walls 79 and 80 and are connected at their forward ends by a semi-circular portion 99, which is concentric to the opening 76 and the inner face of which is in the circular surface of the inner faces of the abutments 81 and 82. A flange 100 extends inwardly from the portion 99 in a plane above the abutments 81 and 82 and guide wings 101 and 102 extend backwardly and upwardly from the flange 100 and inwardly from the upper edges of the arms 97 and 98 so as to form guide ways which will swing up and down on the pintles 95' and 96 and which are comparatively wide at their rear ends and lead to the center at their forward ends, the center being in the vertical plane of the opening 76.

A flange 103 extends horizontally outwardly from the bottom of the portion 99 and stiffening flanges 104 and 105 extend from the ends of the flange 103 along the arms 97 and 98 to their rear ends.

A latch 106 is slidingly mounted upon the platform 3 in slide ways 107 and has a lost motion slot 108 through which the operating arm 92 extends. The latch jaw 109 extends upwardly and backwardly from the body of the latch 106 to engage the flange 103 and securely hold the vertically swinging guide way member 95 down upon the platform 3. The slot 108 is so located relative to the operating arm 92 and the slide 83 that when the crank 90 is moved forwardly the slide 83 will open the hole 76 and then further movement of the hand lever 90 forwardly will move the latch jaw 109 out of engagement with the flange 103.

A coil spring 110 is mounted upon the shaft 87, one end 111 of the spring being anchored in one member of the slide way 107, and the other end 112 of the spring being anchored in the latch 106, and the tension of the spring being exerted to hold the latch in closed position.

A second rock shaft 113 is mounted in the bearing brackets 85 and 86. A crank arm 114 is connected to the outer end of the shaft outside of the crank arm 88. A link 115 is connected to the lower end of the crank arm 114 and to the operating brake hand lever 116 controlled by a sector 117. A U-shaped yoke has a central portion 118 mounted upon the shaft 113 between the bearings 85 and 86 and has arms 119 and 120, and pintles 121 and 122, said pintles extending toward each other in a transverse plane substantially in line with the opening 76 so that when the hand lever 116 is moved forwardly the pintles 121 and 122 move downwardly as shown in Fig. 4, and when the hand lever 116 is moved backwardly, the pintles 121 and 122 move upwardly as shown in Fig. 5. The parts from 72 to 122 constitute the tractor connector assembly 123.

The details of the semi-trailer connecter assembly 130 are as follows:

A substantial platform 131 is rigidly secured to the lower faces of the side frame bars 132 and 133 and to the front cross bar 134 of the semi-trailer. The king bolt 135 is secured to the transverse center of the platform 131 near its longitudinal center and extends downwardly. The upper part of the king bolt 135 has a straight cylindrical portion 136. A neck 137 extends downwardly from the cylindrical portion 136, and a flattened ball shaped head 138 extends downwardly from the neck 137. When the tractor is moving into position to be coupled to the trailer as in Fig. 11, the head 138 will pass into the wide opening between the rear ends of the arms 97 and 98 and will be guided past the abutments 81 and 82, and in this operation the head will pass below the flanges 101 and 102 and raise the vertically swinging guide way member 95 upwardly as shown in Fig. 12, and the head 138 will pass under the flange 100 against the inner face of the semi-circular portion 99.

At this time the latch jaw 109 is withdrawn to allow the vertically swinging guide way members 97 and 98 to swing upwardly. Then the hydraulic system is operated to raise the platform 3 until the head 138 passes downwardly and rests upon the platform 3 around the opening 76, and as the head 138 passes downwardly, the lower end of the cylindrical portion 136 of the king bolt presses downwardly on the flange 100 and carries the swinging guide member 95 downwardly and the flange 103 engages the beveled rear face 139 of the latch jaw 109 and presses the latch backwardly against the spring 112 until the flange 103 snaps past the latch jaw and then the latch jaw engages over the flange 103 and holds the head 138 in engagement with the abutments 81 and 82 so that the head 138 and co-operating parts forms a knuckle joint which firmly connects the tractor to the trailer and allows either the tractor or the trailer to rock transversely, and in this rocking motion the platform 131 will engage the cylinder heads 8 and 9 and compress the springs 6 and 7 more or less as required by the rocking motion.

The details of the semi-trailer brake operating assembly 145 are as follows:

A grooved wheel 146 is slidingly mounted upon the portion 136 of the king bolt, said wheel having wide flaring flanges 147 and 148 so that when the trailer and tractor come together for coupling and the brake operating hand lever 116 is properly manipulated to locate the pintles 121 and 122, the pintles will pass between the flanges 147 and 148 and then the wheel 146 may be raised or lowered upon the king bolt by manipulating the hand lever 116. A post 149 is rigidly mounted upon the grooved wheel 146 to slide vertically through the platform 131 as the spool moves up and down. A block 150 is mounted upon the platform 131. A bell crank lever 151 is mounted upon a pivot 152 mounted in the bearing block 150. The rear horizontal end of the bell crank lever 151 is bifurcated to form a pair of prongs 153, and the upper end of the post 149 is flattened to fit between the prongs 153, there being shoulders 154 at the lower end of the flattened portion to engage the prongs 153 and swing the bell crank lever 151 upwardly when the wheel 146 is moved upwardly.

A pawl rack 155 is slidingly mounted upon the platform 131 and connected to the vertical downwardly extending arm of the lever 151 by a pivot 156. A pawl 157 is pivotally connected to the bearing block 150 by a pin 158 and has a hook shaped tooth 159 to engage the teeth 160 of the pawl rack 155 and hold the pawl rack from being pulled backwardly. A rod 161 is connected to the pawl rack 155 and extends backwardly and is connected to a lever 162 by a pivot 163 near the center of the lever. A link 164 connects the inner end of the lever 162 to the brake evener 165 and brake rods 166 and 167 connect the ends of the evener 165 to the brake constructions 168 and 169 on the rear wheels of the semi-trailer. When the pawl 157 is held elevated as in Fig. 8, the arm 223 engaging the flange 224 of the beam 219, the brake hand lever 116 may be operated to operate the brakes 168 and 169 as desired. When the hand lever 116 is operated to set the brakes and the pawl 157 operated to engage the pawl rack teeth 160, the brakes 168 and 169 are set and held set while the tractor is disconnected and moved away. If it is desired to release the brakes to move the trailer without the operation of the tractor, the pin 170 which is inserted through the outer end of the lever 162 to connect the lever to the supporting bar 171 may be removed and the handle 172 operated to release and reset the brakes as desired.

The details of the assembly 175 comprising the semi-trailer secondary wheels and means for raising and lowering the wheels are as follows:

The semi-trailer is specially constructed for the purpose of adapting the trailer to this invention. The upper face 176 of the rear part of the trailer body is substantially on a level with the upper face 177 of the tractor body. Inclined side frame portions 178 extend upwardly and forwardly from the front of the level portion 176 and the front portion 179 extends forwardly from the upper forward end of the portion 178 on a level considerably above the level 177 of the tractor. The secondary wheel supporting frame consists of vertical side bars 180 extending downwardly from the rear ends of the portion 179, a cross bar 181 connecting the lower ends of the vertical side bars 180, a second cross bar 182 parallel with the cross bar 181 and connected by risers 183 to the lower rear end of the portion 178, and horizontal side bars 184 connecting the cross bars 181 and 182.

Bearing blocks 185 extend downwardly from the ends of the cross bar 181 and inverted A-shaped frames 186 are pivotally connected to the bearing blocks 185. An axle 187 connects the lower apexes of the frames. The secondary wheels 188 and 189 are connected to the ends of the axle 187 by vertical pivots 190 and 191 so that the wheels 188 and 189 are dirigible or steerable.

Steering arms 192 and 193 extend forwardly from the steering knuckles. A connecting bar 194 connects the forward ends of the arms 192 and 193 and a hand operated tongue 195 is pivotally connected to the axle 187 and to the connecting rod 194 so that when it is desired to manipulate the trailer without the use of the tractor the tongue 195 may be manipulated to steer the trailer.

Prongs 196 extend from the upper rear corners of the frame 186 so that when the frame swings downwardly as in Fig. 2, the prongs will strike the cross bar 182 and similar prongs 197 extend downwardly from the lower corners of the frames 186 so that when the frames swing upwardly the prongs 197 will strike the bottoms of the cross bar 182. The cross bar 182 is preferably an angle iron with one flange extending horizontally and forwardly so that the prongs 196 will engage on top of the flange and the prongs 197 will engage under the flange. Double prong latches 198 are pivotally mounted on a shaft 199 extending across the frame above the cross bar 182. The latches 198 are fixed upon the ends of the shaft 199. An operating arm 200 is fixed upon the center of the shaft 199 and extends upwardly and backwardly. The latch arms 201 extend from the shaft 199 downwardly and forwardly in front of the vertical flange of the cross bar 182 so that when the crank arm 200 is tipped backwardly the lower ends of the latch arms will engage the prongs 196 and hold the secondary wheels 188 and 189 upon the ground to support the trailer and so that when the arm 200 is tipped forwardly until the latch arms 201 swing backwardly against the cross bar 182, the prongs 196 will be released to allow the wheels to swing backwardly and upwardly to the position shown in Fig. 15. The latch arms 202 extend downwardly behind the cross bar 182 and have hooks 203 upon their lower ends to project forwardly so that when the prongs 197 are up against the cross bar 182, the hooks 203 will engage under the prongs to hold the secondary wheels up. The latch arms 201 and 202 are so related to each other that both may be operated simultaneously and by operating the crank arm 200. A link 204 is connected to the upper end of the crank arm 200 and to a differential lever 205 mounted upon a rod 206 and a link 207 is connected to the differential lever 205 and extends forwardly.

A retractile coil spring 208 is connected to the link 207 and to the frame cross piece 209. The tension of the spring 208 is exerted to pull the link 207 backwardly, thereby swinging the latch arms 201 and 202 forwardly. The link 207 is connected to a frame 210 consisting of parallel side bars. A bearing block 211 is mounted upon the platform 131. A bell crank lever 212 is mounted upon a stub shaft 213 extending from the bearing block 211 and the vertical arm of the bell crank lever 212 is connected to the frame 210. The upper horizontal arm of the bell crank lever is bifurcated to form a pair of prongs 214. A post 215 is fixed to the wheel 146 and extends slidingly through the platform 131 and freely through the opening in the link 207 and fits in the slot between the prongs 214 and has a head 216 to be engaged by the prongs 214 so that when the parts are released the spring 208 will swing the prongs 214 upwardly against the head 216 and so that when the wheel 146 is moved downwardly the head 216 will bear upon the prongs 214 and operate the bell crank lever 212 to pull the crank 200 forwardly and move the latch bars 201 and 202 backwardly to release either the prongs 196 or 197, as the case may be.

A pin 217 is slidingly mounted through the king bolt 135 and at its axial center, the pin being longer than the king bolt and there being a head 218 upon the upper end of the pin to limit its downward movement, and so that the lower end of the pin will project somewhat below the head 138, and the pin being loosely mounted so that it will normally hang in its lower position, as in Fig. 11, and when the tractor is moving into place the pin passes through the track 78 and when the connecting operation proceeds to the point of operating the hydraulic system to raise the rear end of the tractor the pin will be engaged by the supporting plate 83 and will be elevated as shown in Fig. 13 and held in this elevated position until the supporting plate 83 is withdrawn to uncover the opening 76. Then the pin will fall through the opening 76.

A beam 219 is pivotally connected to bearing blocks 220 secured to the rear side of the cross piece 134 and extends rearwardly over the pin head 218 to a position above the plane of the secondary wheels 188 and 189. Diverging links 221 and 222 connect the rear end of the beam 219 to the frames 186 at points slightly back of and below the bearings 185 so that when the rear end of the beam swings downwardly against the platform 131 as in Fig. 2, the frames 186 will swing downwardly until the prongs 196 pass the latch arms 201, and then if the tractor moves away from the trailer the secondary wheels 188 and 189 will support the forward part of the trailer. When the latch arms 201 are operated to release the prongs 196 and the rear end of the beam 219 swings upwardly, the frames 186 will swing upwardly until the prongs 197 engage the cross bar 182, and then the trailer is ready to be drawn by the tractor with the forward end of the trailer supported upon the tractor and the secondary wheels 188 and 189 elevated and out of use as in Fig. 15. The beam 219 and its connections are operated by the pin 218. When the tractor is approaching the trailer to make a coupling as in Fig. 11, the pin 218 hangs freely and the connecting lever 90 is operated to move the supporting plate 83 to close the opening 76, and when the king bolt head 138 has reached the position shown in Fig. 12, the pin 218 is directly above the supporting plate. Then the hydraulic system is operated to raise the rear end of the tractor platform 3 by the piston stems 12 and 13 bearing downwardly upon the pads 63 and 64 and the supporting plate 83 will support the pin 218 and raise the pin, thereby raising the beam 219 as shown in Fig. 13. This operation raises the secondary wheels 188 and 189 as before explained. The prongs 197 snap past the hooks 203 and the secondary wheels are latched upwardly out of operation. As the platform 3 goes upwardly to the position shown in Fig. 13, the flange 103 snaps past the latch jaw 109 and the coupling is complete and the semi-trailer is under the control of the operator operating the tractor.

At the time the beam 219 goes upwardly, the pawl 157 is raised out of engagement with the pawl rack teeth 160 by the arm 223 extending from the pawl 157 and engaged by the flange 224, see Figure 8, upon the beam 219 and raising the pawl 157 released the brake mechanism so that the trailer may be braked by the operator upon the tractor manipulating the hand lever 116.

The operation is as follows:

When it is desired to disconnect the tractor from the trailer, the hand lever 116 is operated to move the grooved wheel 146 on the king bolt downwardly, thereby causing the head 216 to pull downwardly on the bell crank lever 212 and ultimately pulling forwardly on the crank 200 to release the hooks 203 from the prongs 197. Then the hand lever 90 is operated to move the supporting plate 83 out from under the pin 218 and allow the pin to fall through the opening 76, thereby allowing the beam 219 to fall downwardly, thereby swinging the frames 186 downwardly until the prongs 196 snap by the latch bars 201. At the time the secondary wheels fall down and previous to that time, the forward end of the trailer is held high enough to allow the secondary wheels to swing free above the ground and if the forward end of the trailer is not high enough it will be jacked up by the hydraulic mechanism. Before this the hand lever 116 is operated to move the wheel 146 upwardly, the pawl 157 has been released, and when the hand lever is operated with sufficient force, the rack bar 155 will be pulled forwardly to firmly set the brakes upon the trailer and the pawl tooth 159 will engage the pawl teeth 160 to hold the brakes set. Then the hand lever 90 will be operated to withdraw the latch 106 and release the flange 103. The hydraulic system will be operated to lower the tractor platform 3 and to lower the secondary wheels 188 and 189 to the ground so as to support the trailer, and during this operation the head 138 will raise the vertically swinging guide way member 95 so that the head 138 will pass over the abutments 81 and 82 and the tractor is free of the trailer, the trailer brakes are set, and the trailer is supported in position for the tractor to return and make the connection.

The various operations in handling the vehicle and the trailer, stated consecutively will be, first stopping the vehicle; then release latch 109 (relying on shoulders 81—82 to hold the coupling); then set the brake while the secondary wheels are still up (by relying on the pawl 157 to drop by gravity into its holding position); then operate the hydraulic lift to get as much clearance as necessary for the secondary wheels and to lift 138; then release double prong latch 198, drop the secondary wheels 188—189; this descent making a positive holding of the pawl 157. Then the tractor should be lowered slightly to get the ball 138 on the incline 79—80; then lower the hydraulic pistons to get the secondary wheels on the ground and further lower the pistons to get the tractor fully clear.

Various changes may be made without departing from the spirit of my invention as claimed.

I claim:

1. An automobile train, comprising in combination a tractor, a trailer, a rigid king pin extending downwardly from the trailer, a pair of guide walls on the tractor spread apart at their rearward end, adapted to guide the king pin, said guide walls having abutments at their forward end to engage the rear side of the king pin, a yoke swivelly mounted on the tractor, adapted to engage the forward part of the king pin and means to latch said yoke in firm position, thereby forming a socket for the king pin and forming the driving connection between the tractor and the trailer.

2. An automobile train as claimed in claim 1, in which the king pin is provided with an enlarged head on its lower end and a reduced neck thereabove and the said yoke is provided with a pair of guide wings adapted to engage the king pin at the neck above the head and said yoke having an inwardly extending flange to engage the upper portion of the head of the king pin when the yoke is in its latched position.

3. An automobile train as claimed in claim 1, in which the king pin is provided with an enlarged head at its lower end and a reduced neck immediately thereabove, the said yoke having a pair of arms having their swivelling point adjacent the rearward ends of the guide walls, the said yoke having a pair of guide wings adapted to engage the king pin adjacent the neck above the head and having a forwardly extending flange at its lower edge, and a sliding latch mounted on the tractor having manual means to operate said latch to latch and unlatch the king pin in its traction position.

4. An automobile train comprising a tractor and a trailer, a rigid king bolt mounted on the trailer, a grooved wheel slidably mounted on the king bolt, a pair of guide walls on the tractor spaced wide apart at their rearward ends, terminating at their forward ends in a central position, means on the tractor forming an operative connection with the king bolt to latch said king bolt in the central position, manually operated means on the tractor positioned to engage the grooved wheel, and operative mechanism on the grooved wheel adapted to set the brakes on the trailer.

5. An automobile train as claimed in claim 4, having in addition secondary wheels on the trailer and operative mechanism connected with the grooved wheel adapted to control the latching and unlatching of the said secondary wheels.

6. An automobile train comprising in combination a tractor and a trailer, a rigid king bolt extending downwardly from the forward end of the trailer, guide walls on the tractor located thereon to guide the king bolt to a central position, operative means on the tractor to latch the king bolt in said central position, a pin slidably mounted to extend through the king bolt, operative means on the tractor engaging the lower end of said pin, secondary wheels on the trailer and an operative connection between the top of said pin and the said secondary wheels adapted to raise and lower said wheels on the raising and lowering of the trailer.

7. An automobile train as claimed in claim 6, having in addition a grooved wheel slidably mounted on the king bolt, manually operative means on the tractor to slide said grooved wheel, a latch mechanism on the trailer adapted to latch the secondary wheels in their lower position and an operative connection from the grooved wheel to said latch mechanism.

8. In an apparatus for coupling a semi-trailer to a tractor so that the forward end of the trailer rests upon the rear end of the tractor, a hydraulic system having vertical piston cylinder constructions with the stems of the pistons adapted to engage the rear axle of the tractor and the tops of the cylinders to engage the trailer.

9. An automobile train comprising in combination a tractor having a rear axle, a platform and springs supporting the platform from the axle, a trailer, means operatively connecting the platform of the tractor to the trailer, adapted to support the trailer and form a traction connection, operative means on the tractor engaging the rear axle of the tractor and the trailer, adapted to elevate said trailer, said means allowing the platform of the tractor to rise as the load is removed therefrom.

10. An automobile train as claimed in claim 9, in which the operative means engaging the axle of the tractor and the trailer comprises a hydraulic system normally mounted on the platform of the tractor, said hydraulic system having operative means adapted to extend to engage the rear axle and to elevate the trailer from the rear axle of the tractor.

11. An automobile train comprising a tractor, a platform on the rear end thereof, a trailer having a platform at the forward end thereof, springs supporting the platform of the tractor from the rear axle of said tractor, cylinders slidably mounted in the platform of the tractor, springs adapted to support said cylinders in an upward position, pistons in the cylinders having downwardly extending piston stems, the lower end of said stems being adapted to engage the rear axle of the tractor, and manual means to control a fluid to force the pistons downwardly and thereby engage the cylinders with the platform of the trailer and the piston stems with the axle of the tractor, thereby elevating the trailer.

12. An automobile train as claimed in claim 11, having in addition secondary wheels on the trailer, means on the trailer to latch said wheels in an upper housed or lower extended position, an operative connection from the tractor to the trailer to unlatch and latch the said latch mechanism, and operative means between the tractor and the trailer, said means being adapted to lower and raise the said secondary wheels on the raising and lowering of the trailer relative to the platform of the tractor.

13. In an apparatus for connecting a semi-trailer to a tractor so that the forward end of the trailer rests upon the rear end of the tractor, a hydraulic system mounted upon the tractor and operated by the power plant of the tractor for raising and lowering the tractor body and the forward end of the trailer body, connector assemblies upon the tractor and trailer and operated by the hydraulic system, and service elements upon the tractor and trailer for controlling the trailer and connected and disconnected by connecting and disconnecting the trailer.

14. In an apparatus for connecting a semi-trailer to a tractor so that the forward end of the trailer rests upon the rear end of the tractor, a hydraulic system mounted upon the tractor comprising a plurality of cylinders, the semi-trailer having a platform adapted to engage the upper ends of the cylinders, the tractor having a platform slidably supporting the cylinders, pistons in the cylinders having stems adapted to engage the rear axle of the tractor, said hydraulic system being operated by the power plant of the tractor for raising and lowering the tractor body and the forward end of the trailer body, connector assemblies upon the tractor and the trailer and operated by the hydraulic system and service elements upon the tractor and the trailer for controlling the trailer and connecting and disconnecting by connecting and disconnecting the trailer.

15. In an automobile train, a tractor having a power plant, a hydraulic system operated by the power plant and having vertical piston cylinder constructions with piston stems adapted to engage the rear axle of the tractor and raise the tractor body.

16. In an automobile train, a tractor having a power plant, a hydraulic system operated by the power plant and having vertical piston cylinder constructions with piston stems adapted to engage the rear axle of the tractor and raise the tractor body to raise the forward end of the semi-trailer body, and means for holding the forward end of the semi-trailer body raised while the tractor is uncoupled and moved away.

17. In an automobile train, a tractor, a trailer having a king bolt extending downwardly at its forward end with a circular end upon the lower end of the king bolt, guide walls on the tractor to guide the king bolt to a central position, means upon the tractor for forming a socket for the head of the king bolt so as to make a ball and socket joint connecting the trailer to the tractor, a pin slidably mounted through the king bolt, a supporting plate slidably mounted on the tractor adapted to support the lower end of the said pin, secondary wheels on the trailer and an operative connection between the upper end of the said pin and the wheels adapted to raise the wheels when the pin is supported by the said plate and to lower the wheels when the plate is removed from under the pin.

18. In an automobile train as claimed in claim 17, having in addition manually operated means on the tractor to slide the said plate.

19. In an automobile train as claimed in claim 17, having in addition manually operated means on the tractor to slide the said plate and having a slidable grooved wheel on the king bolt, a manually operated device on the tractor to slide said wheel and an operative connection on the trailer controlled by said wheel to set the brakes and a latching mechanism on the trailer having an operative connection from the said wheel to latch the secondary wheels in a housed or extended position.

20. In an automobile train, a tractor having a platform, cylinders slidably mounted therein, springs for yieldingly holding the cylinders elevated, a socket upon the platform between the cylinders, a king bolt carried by a semi-trailer and having a head fitting in the socket, means for holding the head in the socket, and a platform upon the semi-trailer around the king bolt and adapted to rock against the piston cylinders.

21. In an automobile train, a tractor and a semi-trailer, a hand lever and pump upon the tractor so that the operation of the hand lever connects the pump to the tractor power plant, a hand lever and hydraulic system upon the tractor and connected to the pump so that the operation of the hand lever controls the hydraulic system, a hand lever upon the tractor, brakes upon the semi-trailer adapted to be operated by the hand lever, means for connecting the semi-trailer to the tractor, and a hand lever upon the tractor for operating the connecting means.

In testimony whereof I have signed my name to this specification.

LAGAR RUAL CULVER.